July 17, 1923.
F. B. CAREY
FLYTRAP
Filed Aug. 21, 1922
1,462,004
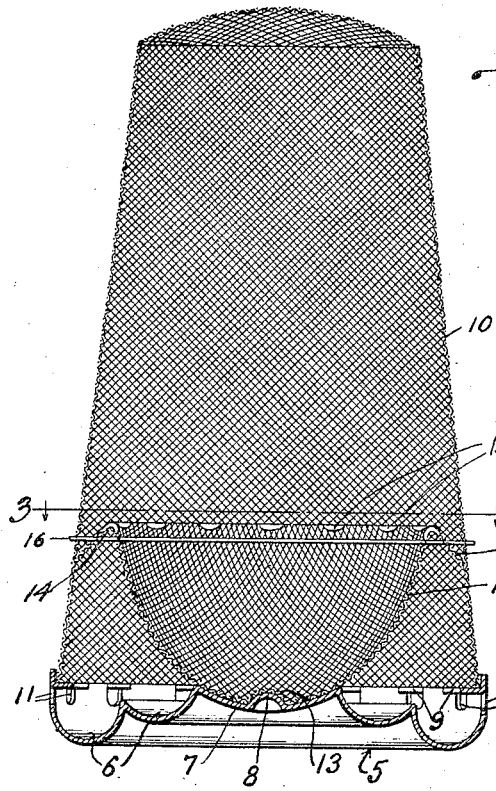
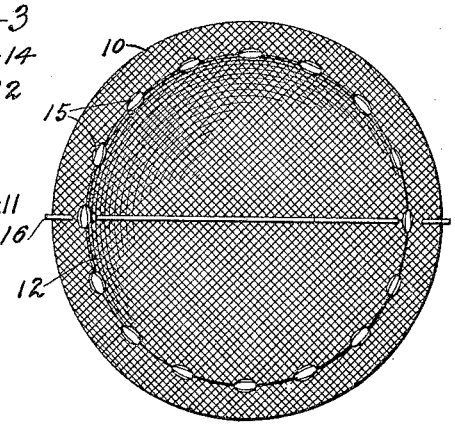
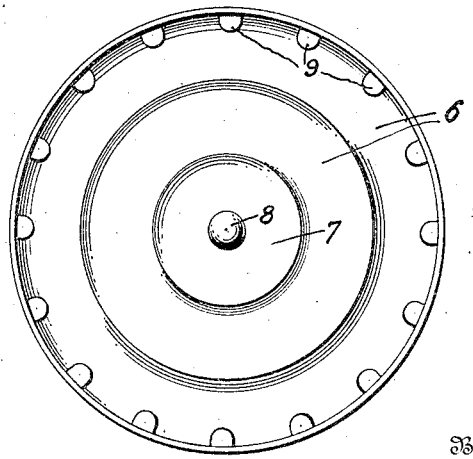
Inventor
F. B. Carey
By Attorney Patented July 17, 1923.

1,462,004

UNITED STATES PATENT OFFICE.

FRANK B. CAREY, OF FRESNO, CALIFORNIA.

FLYTRAP.

Application filed August 21, 1922. Serial No. 583,244.

*To all whom it may concern:*

Be it known that I, FRANK B. CAREY, a citizen of the United States, residing at Fresno, in the county of Fresno and State of California, have invented certain new and useful Improvements in a Flytrap, of which the following is a specification.

My invention relates to fly traps and its principal object to provide a reticulated cage type fly trap which can be readily taken apart for cleaning or other purposes.

A further object of the invention is to provide a reticulated trap of this character which embodies a bait holding pan and reticulated cage supported on the pan in a novel manner.

It is also an object of the invention to provide a fly trap having a removable concavo-convex bottom or receptacle adapted to retain the dead flies, which may be readily removed from the trap and its contents emptied.

With the preceding and other objects and advantages in mind, my invention consists in the novel combination of elements, constructions and formations and arrangements of parts to be hereinafter specifically referred to, claimed and illustrated in the accompanying drawings wherein:

Fig. 1 is a vertical sectional view of a fly trap embodying my invention.

Fig. 2 is a plan view of the bait retaining pan used in connection with the invention, and Fig. 3 is a horizontal sectional view taken on line 3—3 of Fig. 1.

Referring in detail to the drawings wherein corresponding characters of reference designate corresponding parts throughout the several views, the numeral 5 designates a circular pan provided with stepped circular depressions 6 and a central concave seat 7 formed with a centrally disposed upstanding boss 8. The stepped depressions 6 constitute liquid bait retaining chambers, while the seat 7 serves to support the removable bottom or fly retaining receptacle to be hereinafter referred to.

As shown in Figs. 1 and 2, the side walls of the pan 5 have right angularly and inwardly disposed tongues 9 struck therefrom upon which an inverted frustoconical cage 10 is supported. By striking the tongues 9 in the side walls of the pan 5 openings 11 are provided for the entrance of the flies to the bait retaining depressions 6.

Resting in the seat 7 is a bowl-shaped fly retaining receptacle or removable bottom 12 having a centrally disposed depression 13 in its bottom which receives the boss 8. The upper edge of the reticulated material forming the bottom or receptacle 12 is turned back and extended downwardly at an oblique angle, as indicated at 14, and extends to the side walls of the cage 10. This part 14 is privided with a series of openings 15, whereby the flies in an endeavor to escape pass into the cage. In order to hold the cage 10 and the bottom or receptacle together, a removable pin 16 extends transversely through the cage and side walls of the bottom or receptacle 12.

Having thus described my invention, what I claim as new and desire to secure and protect by Letters Patent of the United States is:

1. A fly trap comprising a pan having stepped circular depressions therein adapted to contain a liquid bait and also provided with a central concave seat, and a reticulated cage having a concave bottom resting in the seat, said bottom and the side walls of the pan being provided with openings for the entrance of the flies.

2. A trap comprising a pan having stepped bait retaining depressions and a central concave seat, a reticulated cage supported by the pan and a bowl-shaped bottom in the cage and resting in the seat, said bottom being provided with entrance openings adjacent its upper edge, the side walls of the pan being also provided with openings.

3. A trap comprising a pan having stepped bait retaining depressions and a central concave seat, a reticulated cage supported by the pan and a bowl-shaped bottom in the cage and resting in the seat, said bottom being provided with entrance openings adjacent its upper edge, the side walls of the pan being also provided with openings, and a removable pin extending transversely through the cage and bottom for holding the cage and bottom together.

4. A trap comprising a circular pan adapted to retain bait and having inwardly and right angularly disposed tongues struck from the side walls thereof, a reticulated frustoconical cage supported on the tongues, the openings afforded by striking the tongues in the side walls constituting fly entrance openings, and a reticulated bowl-shaped bottom arranged in the cage, and having its upper edges extended to touch the side walls of the cage and provided with entrance openings.

In testimony whereof I affix my signature.

FRANK B. CAREY.